Dec. 26, 1933.   J. E. SMITH   1,940,775
PERCOLATOR
Filed Sept. 8, 1931   2 Sheets-Sheet 1
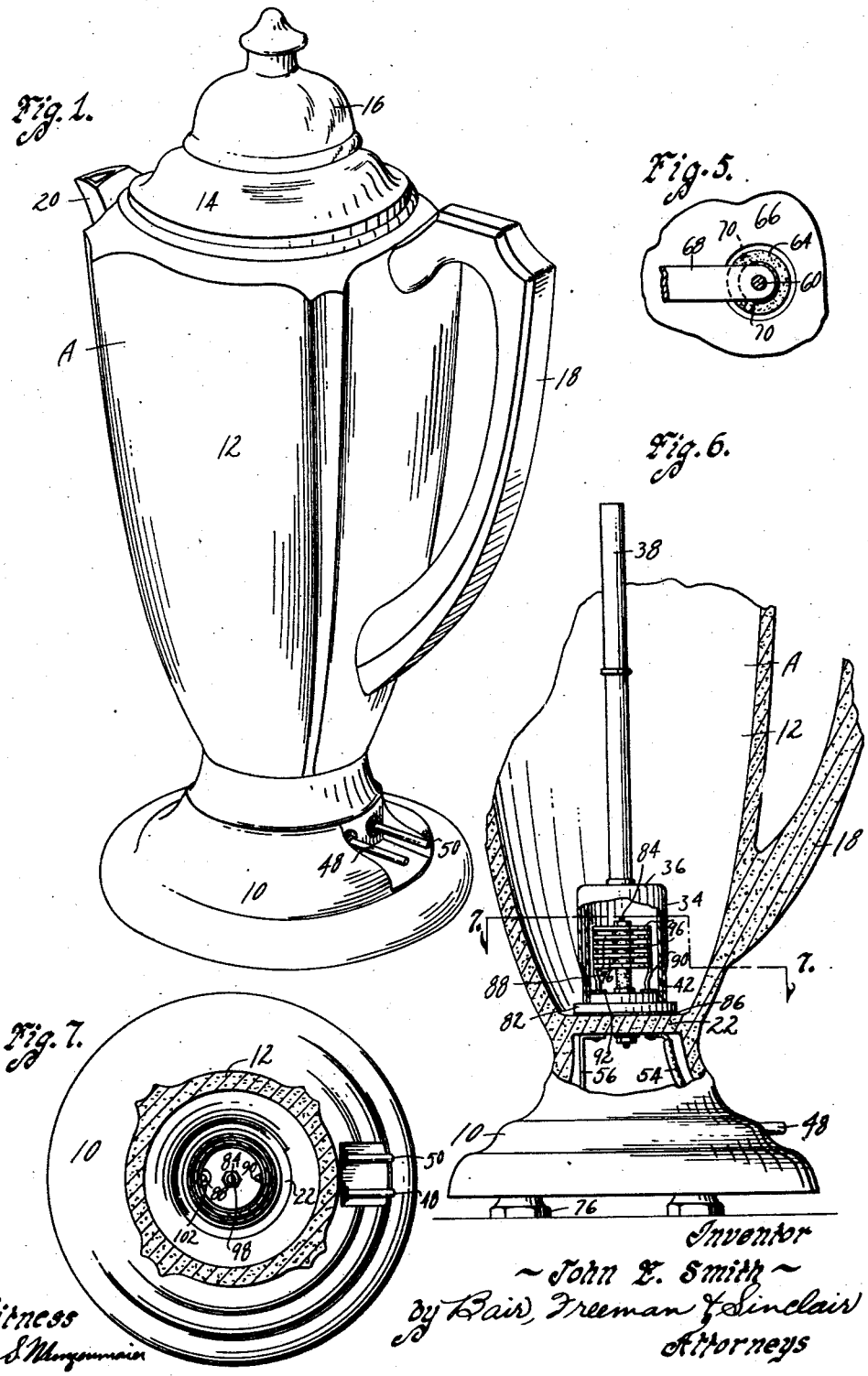

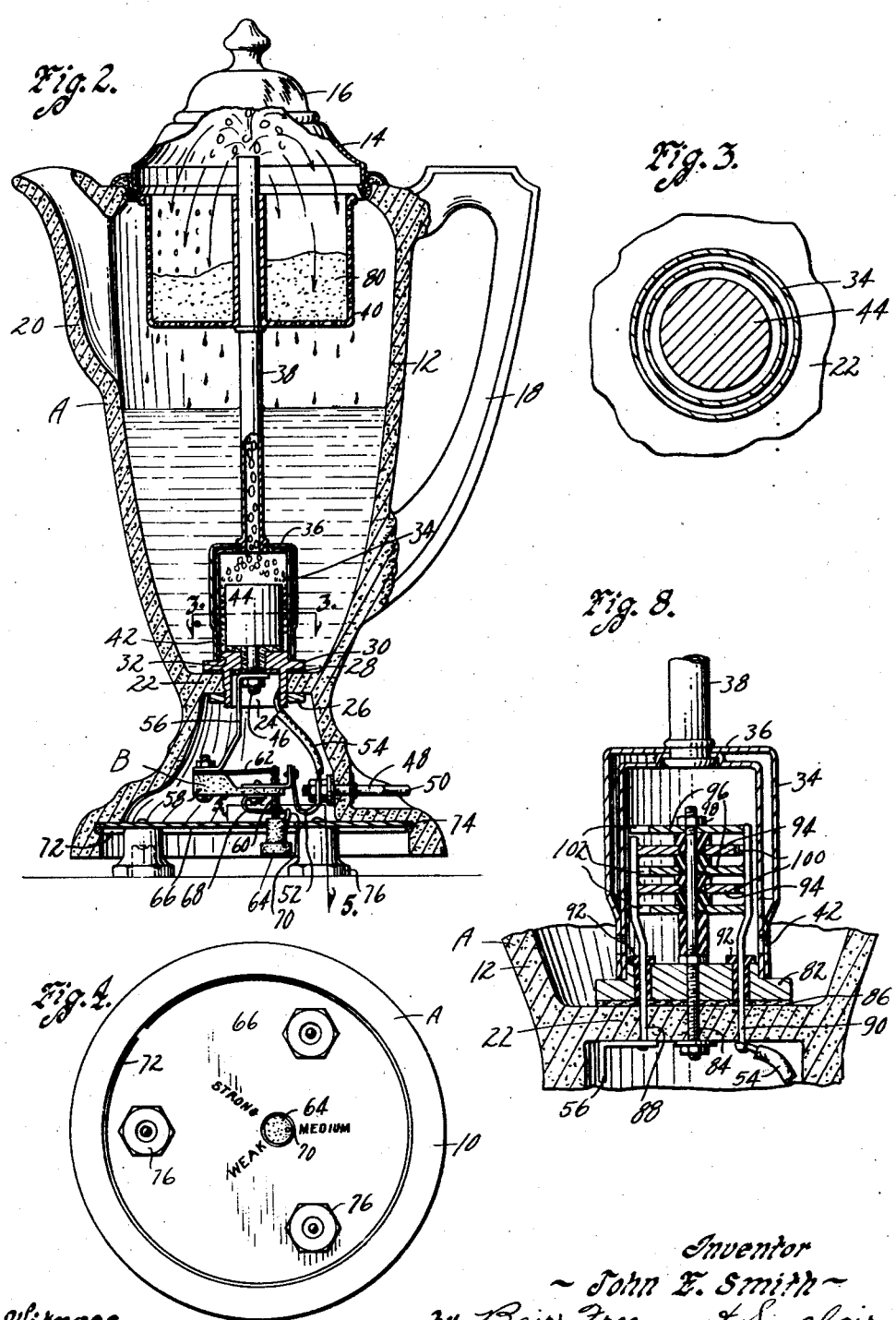

Patented Dec. 26, 1933

1,940,775

UNITED STATES PATENT OFFICE 1,940,775

PERCOLATOR

John E. Smith, Belleville, Ill., assignor to Knapp-Monarch Company, Belleville, Ill., a corporation of Missouri Application September 8, 1931. Serial No. 561,626

5 Claims. (Cl. 219—44)

An object of my invention is to provide a percolator having an immersion type of heating element of simple, durable and inexpensive construction.

A further object is to provide an electric percolator which, upon energization of the heating means, will immediately start the water to percolating so that by the time it is thoroughly heated throughout, the coffee, or other beverage being percolated, will be of the desired strength.

Still a further object is to provide heat responsive means for cutting off the supply of current, such means being adjustable so that weak, medium or strong coffee may be percolated as desired by merely adjusting the heat responsive means.

More particularly, it is my object to provide a percolator comprising a pump cylinder into which water may flow and from which steam may flow through a riser tube, spaced electrodes being provided within the cylinder to which current is supplied so that the current will pass directly through the water itself for converting it into steam and causing percolation thereof.

Still a further object is to provide means for causing the pump cylinder itself to constitute one of the electrodes.

Another object is to provide a heating means having a heat conducting base extending through the bottom of the percolator container so that after the water is heated it will heat the heat conductor which in turn will radiate heat to a heat responsive control switch which will thereby automatically shut off the current supply after the water in the percolator has reached the requisite temperature for coffee of the desired strength.

Another object is to provide convenient means for adjusting the heat responsive means so that any desired strength of coffee may be percolated.

With these and other objects in view my invention consists in the construction, arrangement and combination of the various parts of my device, whereby the objects contemplated are attained, as hereinafter more fully set forth, pointed out in my claims, and illustrated in the accompanying drawings, in which:

Figure 1 is a perspective view of a percolator embodying my invention.

Figure 2 is a vertical sectional view through the same.

Figure 3 is an enlarged sectional view on the line 3—3 of Figure 2 showing a percolator cylinder and an electrode therein.

Figure 4 is a bottom plan view of the base of the device shown in Figure 2.

Figure 5 is a sectional view on the line 5—5 of Figure 2 showing parts of the adjusting mechanism of the heat responsive control means.

Figure 6 is a partial sectional view of a percolator with a modified form of liquid heating means therein.

Figure 7 is a sectional view on the line 7—7 of Figure 6; and

Figure 8 is an enlarged sectional view of the heater shown in Figure 6.

On the accompanying drawings I have used the reference numeral 10 to indicate a base and 12 to indicate a container of a percolator A. The lid thereof is indicated at 14 and is provided with the usual glass dome 16. A handle and a spout are indicated at 18 and 20 respectively.

The container 12 has a bottom 22 separating the interior of the container from the interior of the base 10 which is hollow, as shown in Figure 2. Through the bottom 22, I provide a sleeve 24 made of metal or similar heat conducting and current conducting material. A nut 26 is screw threaded on to the sleeve 24 and a gasket 28 is interposed between the flange 30 thereof and the bottom 22.

An annular shoulder 32 is provided on the flange 30. A pump cylinder 34 having a top 36 is removably positioned on the shoulder 32. As best shown in Figure 8, the pump cylinder 34 and the top 36 are of hollow construction whereby an air space is provided for preventing the ready passage of heat through the wall of the cylinder. The air space may be filled with insulating material if desired.

From the top 36 of the cylinder 34, I provide a riser tube 38 on which is supported a percolator cup 40. Openings 42 in the cylinder 34 adjacent the bottom thereon allow admission of liquid into the handle.

Within the cylinder 34 and slightly spaced from the wall thereof, I provide an electrode 44. The electrode 44 is suitably insulated from the sleeve 24 and is provided with a terminal screw 46.

Connector prongs 48 and 50 extend through the base 10 and serve the purpose of providing an electrical connection with a double socket electric plug of the ordinary kind used on percolators and other electrical appliances. The entire container 12 and base 10 may be made of insulating material, such as porcelain, and thus the prongs 48 and 50 are efficiently insulated from each other. Leads 52 and 54 extend from the prongs 48 and 50. The lead 52 connects with a heat responsive timing device B, which in turn is connected by a lead 56 with the terminal screw 46 of the electrode 44. The lead 54 connects with the sleeve 24.

The heat responsive device B comprises a base 58 of insulating material, an adjustable contact 60, and a thermostatic contact bar 62. The bar 62, for instance, is of bi-metallic metal whereby it will warp in a predetermined direction upon application of heat thereto.

The adjusting screw 60 has a knob 64 extending through a base plate 66 in the base 10. A leaf spring 68 binds against the threads of the adjustable contact 60 so that it will remain in any position to which it is adjusted. A lug 70 may be provided for engaging the spring 68 to prevent excessive rotation of the control knob 64.

As shown in Figure 4, the base plate 66 may be provided with indicating characters so that the user can adjust the knob 64 as desired. The base plate 66 may be retained in position by a spring wire 72 in a groove 74 of the base 10. The members 76 are supporting feet for the percolator.

*Practical operation*

In the operation of my percolator construction, the thermostatic switch B is normally in closed position and when the prongs 48 and 50 are connected with a source of current supply and water poured into the container 12 percolation will immediately start because the water flowing through the openings 42 and into the cylinder 34 is immediately vaporized by the passage of current therethrough from the cylinder, which constitutes one electrode, to the other electrode 44. The cylinder 34, it will be noted, engages the shoulder 32 and thus provides a path for the electric current from the lead 54 and the sleeve 24 to the cylinder 34. Conversion of the water into steam within the cylinder 34 causes the steam and globules of water to rise through the riser tube 38 and impinge against the dome 16 and then fall over the coffee 80 within the percolator cup 40. The percolator cup 40, of course, is perforated so that the heated water, after passing through the coffee, will drip into the container 12.

Since the water between the electrodes is immediately converted into steam, it will be obvious that percolation will immediately start whenever current and water are supplied to the percolator. The water will eventually all pass through the pump cylinder 34 and be vaporized and heated therein so that by the time the entire body of water is heated to the desired temperature, the coffee will be strong enough because of percolation through this entire period.

The sleeve 24 is a heat conductor so that it will gradually become heated as the water becomes heated. This heat will be radiated to the thermostatic bar 62 so that when the water is at the proper temperature or the coffee is at the proper strength, the current will be shut off by the warping of the bar 62 for separating it from the contact screw 60. It will be obvious that adjusting the screw 60 will cause earlier or later opening of the circuit for weaker or stronger coffee as desired.

In Figures 6, 7 and 8, I have shown a modified form of construction in which a flange 82 is secured to the bottom 22 by a threaded rod 84 and nuts. A gasket 86 is interposed between the flange 82 and the bottom 22. Current conducting wires 88 and 90 extend through insulating bushings 92 of the flange 82 and connect with the respective leads 54 and 56. The wires 88 and 90 connect with disks 94 and 96 respectively, which are alternately arranged. The disks 94 and 96 constitute opposite electrodes and are supported on the rod 84 by a nut 98 and suitable insulating bushings. The disks 94 and 96 are soldered to the wires 88 and 90 respectively while the disks 94 have notches 100 and the disks 96 have notches 102 to prevent contact of the disks 94 and 96 with the wires 90 and 88 respectively.

In this type of construction the electrodes 94 and 96 are complete in themselves and are surrounded by the cylinder 34, but the cylinder does not constitute an electrode and in fact is entirely insulated from either of the electrodes. This is true because the cylinder 34 engages the flange 82 and the wires 88 and 90 are insulated from this flange by the bushings 92.

I have provided a percolator in which the resistance wire type of heating element is entirely eliminated and the resistance of the water is depended upon for heating of the water and the conversion thereof into steam for obtaining the percolator action. Such a construction produces a much quicker percolation than where a resistance wire type of heating element is used. Different forms of the electrodes may be provided (two different forms being shown on the drawings) for producing an immersion type of heater for the liquid. In each instance, however the pump cylinder 34 is used in which vaporization of the liquid occurs for the purpose of causing percolation of the water.

Some changes may be made in the construction and arrangement of the parts of my device without departing from the real spirit and purpose of my invention, and it is my intention to cover by my claims, any modified forms of structure or use of mechanical equivalents, which may be reasonably included within their scope.

I claim as my invention.

1. In a percolator, an immersed pump cylinder formed of conducting material, an electrode in said cylinder, means for connecting said electrode and said cylinder with current supply wires of opposite polarity, a riser tube from the top of said cylinder and an opening in said cylinder adjacent the bottom thereof for admitting liquid into the cylinder.

2. In a percolator, a container, an electrode therein, a cylinder of electricity conducting material removably positioned on said electrode and thereby electrically connected therewith and having a riser tube from the top thereof, an opening for admitting liquid into said cylinder at a point spaced below said top and a second electrode within said cylinder of opposite polarity with respect to the first mentioned electrode.

3. In a percolator, a container, a cylinder therein and constituting an electrode, said cylinder having a riser tube from the top thereof, an opening adjacent the bottom of said cylinder for admitting fluid thereto and a second electrode within said cylinder of opposite polarity with respect to the cylinder.

4. In combination with a relatively deep container, a liquid heater comprising an immersed cylinder in said container adjacent the bottom thereof, spaced electrode means within said cylinder for vaporizing liquid, the interior wall of said cylinder constituting one of said electrodes and means of communication between the bottom and the top of said cylinder with the space within said container.

5. In a liquid heater, a container, a base thereon and separated therefrom by the bottom of said container, a heat conductor through said bottom, a pump cylinder within said container and connected with said heat conductor, an electrode extending upwardly from said heat conductor, said pump cylinder constituting a second electrode, said electrodes being immersed in liquid within said container and heat responsive means within said base and actuated by heat radiated from said heat conductor to open the circuit through said electrodes.

JOHN E. SMITH.